US007857481B2

(12) United States Patent
Oh et al.

(10) Patent No.: US 7,857,481 B2
(45) Date of Patent: Dec. 28, 2010

(54) MULTI-FUNCTIONAL TRAFFIC SIGNAL STICK

(75) Inventors: Young-Jik Oh, 301 Na-Dong Deoksan-bilra, 92-5 Gayang-Dong, Dong-Gu, Daejeon-City 300-802 (KR); Byung-Hoon Jun, Daejeon (KR); Jae-Kyu Kwon, Daejeon (KR)

(73) Assignee: Young-Jik Oh (KR)

( * ) Notice: Subject to any disclaimer, the term of this patent is extended or adjusted under 35 U.S.C. 154(b) by 513 days.

(21) Appl. No.: 10/587,957

(22) PCT Filed: Jan. 29, 2005

(86) PCT No.: PCT/KR2005/000273

§ 371 (c)(1),
(2), (4) Date: Jun. 4, 2009

(87) PCT Pub. No.: WO2005/073616

PCT Pub. Date: Aug. 11, 2005

(65) Prior Publication Data
US 2009/0251078 A1 Oct. 8, 2009

(30) Foreign Application Priority Data
Jan. 30, 2004 (KR) .................. 10-2004-0006282
Jan. 30, 2004 (KR) .................. 20-2004-0002262 U

(51) Int. Cl.
*F21L 4/04* (2006.01)

(52) U.S. Cl. .............. 362/202; 362/198; 362/199; 362/427; 362/203

(58) Field of Classification Search ......... 362/197–199, 362/171, 174, 177, 202, 203, 205, 208, 217, 362/553, 555, 523, 427, 418; 315/185 S, 315/200 A
See application file for complete search history.

(56) References Cited

U.S. PATENT DOCUMENTS

| 6,767,115 B2 * | 7/2004 | Blackwelder ............... 362/385 |
| 7,232,244 B2 * | 6/2007 | Naylor ...................... 362/473 |
| 2005/0083679 A1 | 4/2005 | Macierowski et al. |

* cited by examiner

*Primary Examiner*—Tuyet Thi Vo
(74) *Attorney, Agent, or Firm*—Cantor Colburn LLP

(57) ABSTRACT

Disclosed herein is a multi-functional traffic signal stick, which has a red signal LED part for providing a signal stick function and a white signal LED part for providing a flash light function, and which a police officer carries on the road. The multi-functional traffic signal stick can be carried conveniently as a flash light by telescoping each joint of a length-adjustable flashing tube manufactured in an antenna type into a larger tube, and used as a signal stick, which is well seen from a far distance, by stretching each joint of the length-adjustable flashing tube like an antenna. In addition, the present invention can serve to inform danger or accidents when being mounted uprightly on the road or a proper place such that three supporting rods mounted on a grip part at regular intervals are unfolded to support the signal stick.

3 Claims, 3 Drawing Sheets

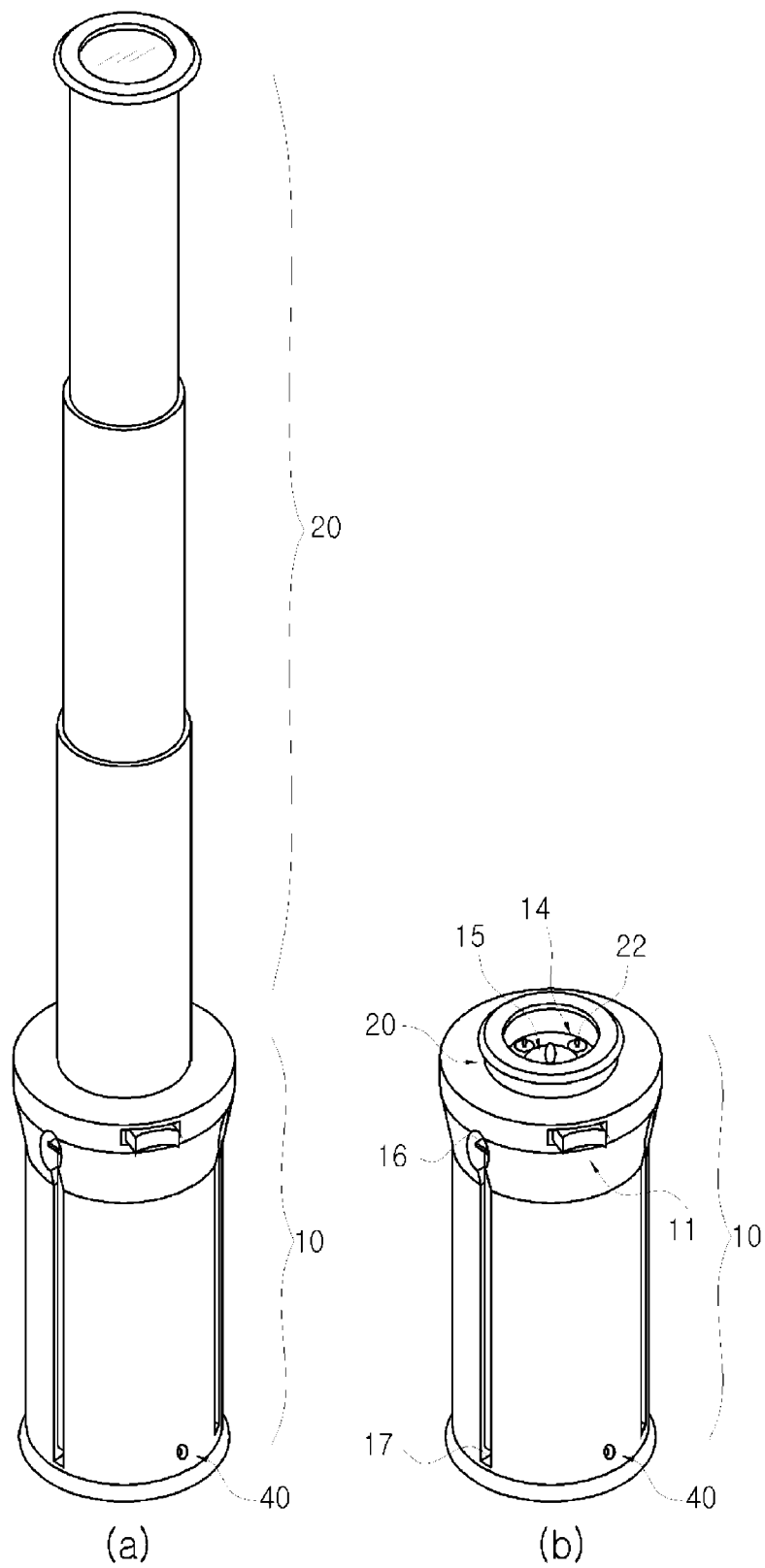
[Fig. 1]

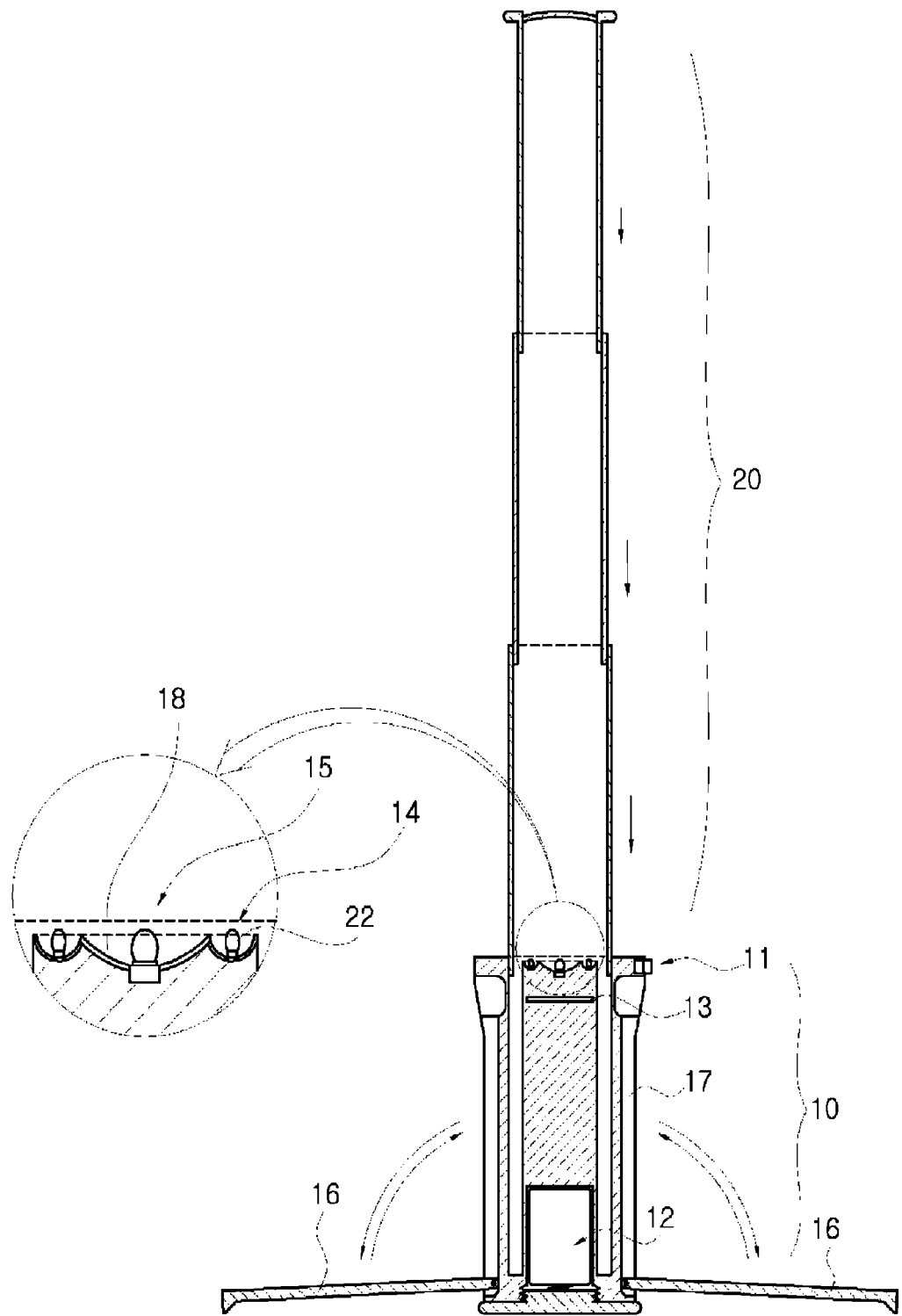
[Fig. 2]

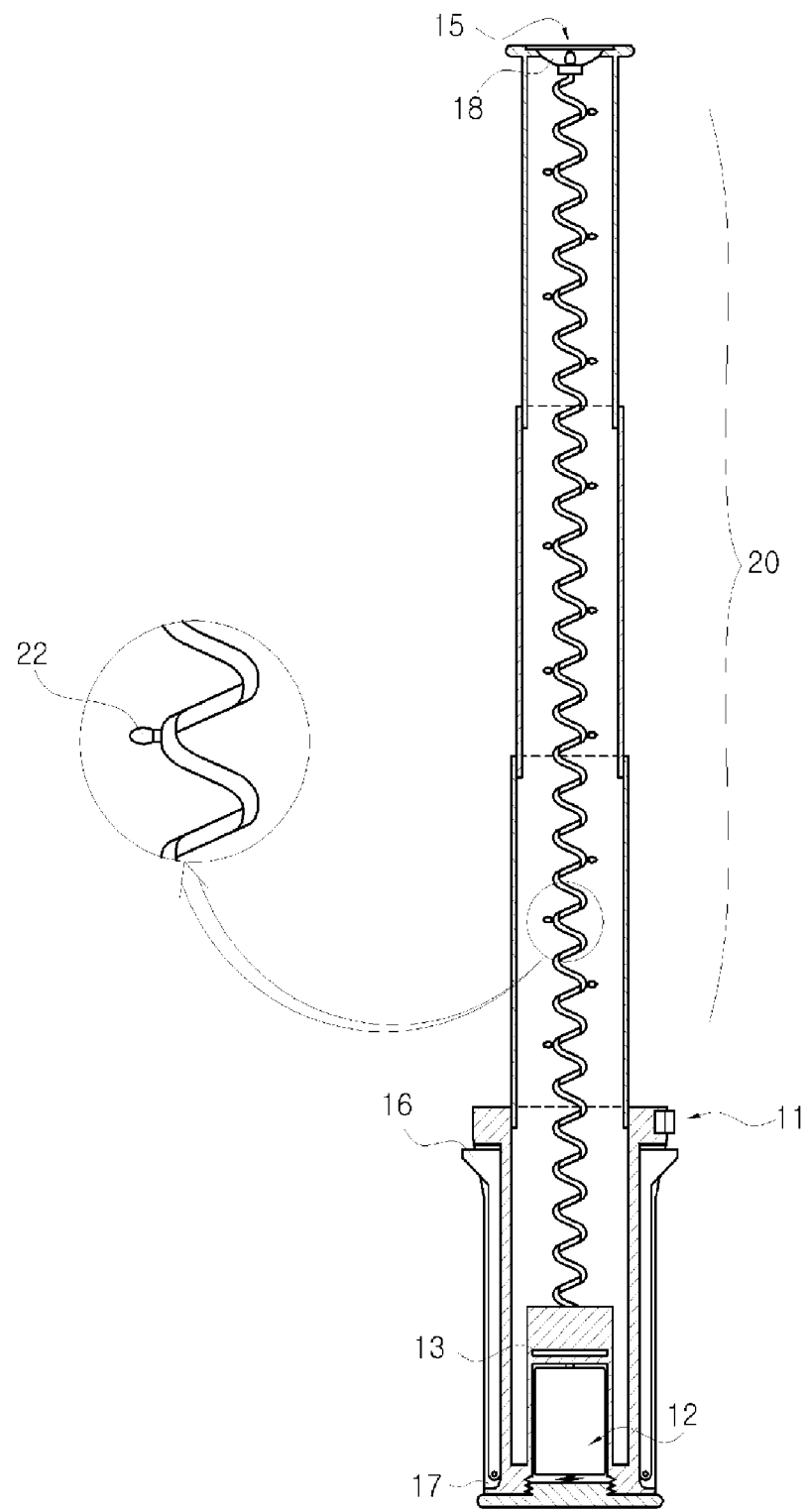
[Fig. 3]

US 7,857,481 B2

MULTI-FUNCTIONAL TRAFFIC SIGNAL STICK

TECHNICAL FIELD

The present invention relates to a multi-functional traffic signal stick, which has a red signal LED part for providing a signal stick function and a white signal LED part for providing a flash light function, and which a police officer carries on the road.

Furthermore, the present invention can be carried conveniently as a flash light by telescoping each joint of a length-adjustable flashing tube manufactured in an antenna type into a larger tube, and used as a signal stick, which is well seen from a far distance, by stretching each joint of the length-adjustable flashing tube like an antenna. In addition, the present invention can serve to inform danger or accidents when being mounted uprightly on the road or a proper place such that three supporting rods mounted on a grip part at regular intervals are unfolded to support the signal stick.

BACKGROUND ART

In general, the traffic signal stick has a number of LEDs mounted inside the signal stick, and is used for induction of a direction of cars or for traffic control by repeatedly turning the LEDs on and off or continuously emitting a red signal.

Such a conventional traffic signal stick is used for the purpose of informing the position and behavior of a person who sends a hand signal at night in order to facilitate a traffic flow or to inform the signal clearly, and for the purpose of sending a signal for safety of workers or for induction of coming and going of cars when the workers work at night. However, in these cases, the signal stick is mostly used for preventing accidents or controlling traffic, but cannot be used as a flash light for sending a signal by being stood on the road or a proper place in a dark place where there is no person.

DISCLOSURE OF INVENTION

Technical Problem

Accordingly, the present invention has been made in view of the above problems occurring in the prior art, and it is an object of the present invention to provide a traffic signal stick which a police officer carries for facilitating flow of cars or checking up the cars on the road.

Another object of the present invention is to provide a traffic signal stick which has both a function of a signal stick and a function of a flash light.

A further object of the present invention is to provide a multi-functional traffic stick, which can be mounted uprightly on the road or other proper place by a tripod mounted on the grip part, thereby preventing additional accidents by sending a signal to other people or cars when an accident occurs even though there is no person.

A still further object of the present invention is to provide a multi-functional traffic stick, which is convenient in carrying by minimizing its size in such a way that a length-adjustable flashing tube is telescoped in an antenna type when it is used as a flash light, and is stretched when it is used as a signal stick.

Technical Solution

To solve the above problems of the prior arts, a multi-functional traffic signal tick according to the present invention includes at least one white signal LED part mounted inside the upper end portion of a grip part thereof, and a number of red LEDs mounted outside the upper end portion of the grip thereof. A user turns on the red LEDs for sending a red signal for smooth flow and safety of cars, and turns on white signal LEDs of the white signal LED part for providing a flash light function when the user does not want to send the signal.

Furthermore, the present invention includes supporting rods formed on the outer circumference of the grip part at regular intervals, and so, can send a signal for safety by standing the signal stick on the road or a proper place by the supporting rods when the supporting rods are unfolded to support the signal stick, even though there is no person.

Moreover, the present invention includes a length-adjustable flashing tube manufactured in an antenna type, and thereby, emits red signal light in a wide area by stretching each joint of the length-adjustable flashing tube in order to clearly transmit the signal, and is conveniently carried by telescoping each joint of the length-adjustable flashing tube into a larger tube in order to minimize its volume and provide a flash light function.

The present invention will now be described in detail in connection with preferred embodiments with reference to the accompanying drawings. The drawings of the present invention show an example of the present invention, and the present invention is not restricted to the drawings, and can be modified according to the needs of a skilled person without departing from the scope of the present invention.

The multi-functional traffic signal stick of the present invention includes a grip part 10 having a plurality of supporting rod grooves 17 formed on the outer circumferential surface thereof at regular intervals; a switch part 11 mounted on and electrically connected to the grip part 10 for allowing for selection of a signal generating function and a flash light function; a power supply part 12 disposed inside the grip part 10 and connected to the switch part 11, the power supply part containing a battery therein; a circuit board 13 installed at an upper portion of the inside of the grip part for controlling power-off and emission of a red signal LED part 14 and a white signal LED part 15 in response to a signal generated from the switch part 11; a length-adjustable flashing tube 20 connected to the grip part 10 in such a manner as to be telescoped or stretched in an antenna type; a plurality of supporting rods 16 pivotally mounted at a lower end portion of the grip part in such manner as to be folded to fit into the supporting rod grooves 17 of the grip part 10 and unfolded to support the signal stick with it positioned uprightly on the road or a proper place; and a reflection plate 18 mounted at a lower portion of the white signal LED part 15.

The present invention will now be described in connection with preferred embodiments with reference to the accompanying drawings. The present invention is not restricted to the drawings, but the drawings of the present invention show a preferred embodiment of the present invention.

FIG. 1(a) is a perspective view of an outward appearance of the traffic signal stick according to a preferred embodiment of the present invention, and FIG. 1(b) is a perspective view of the traffic signal stick when it provides the flash light function. The grip part 10 includes the switch part 11 for connecting it with the power source and switching according the wanted functions, the power supply part 12 and the circuit board 13 mounted inside the grip part 10, and the supporting rods 16 mounted on the circumference of the grip part 10 at regular intervals. The power supply part stops power supply when the switch part 11 of the grip part 10 is maintained at its top surface horizontally, the red signal LED part 14 is operated and serves as a signal light when the switch part 11 is pressed at its top surface to the left, and the white signal LED part 15 is operated and serves as a flash light when the switch part 11 is pressed at its top surface to the right. The circuit board 13 controls all operations according to the switching action. If necessary, the switch part 11 may be a control switch for providing different functions according to the pressing number of the switch part 11, that is, stop of power supply, operation of the red signal LED part when the switch part 11 is pressed once, operation of the white signal LED part 15 when the switch part 11 is pressed once again after operation of the red signal LED part, and stop of power supply when the switch part 11 is pressed once again.

The supporting rods 16 are folded and inserted into grooves 17 formed on the outer circumferential surface of the grip part 10 when a user carries it, but drawn out from the grooves 17 and unfolded to stand and support the signal stick when the traffic signal stick stands on the road. The supporting rods 16 are connected with the grip part 10 via connection pins in such a way as to be inserted into the grooves 17 or drawn out and unfolded from the grooves 17. The unfolded supporting rod 16 adopts means for firmly fixing it and preventing separation of the supporting rod 16 inserted into the groove from the groove excepting a case where the user pulls and unfolds it with his or her fingers. Since such means can be mounted on the supporting rod 16 by well-known means such as protrusions mounted on both sides of the supporting rod, is will not be described in detail, and any one of the well-known means can be used.

The grip part 10 is connected with the cylindrical flashing light 20 made of light-transmittable material by a coupling part 30 located on the front end portion thereof. A number of the white signal LED parts 15 are mounted at the central portion of the upper surface of the grip part 10 inside the coupling part 30, and a number of the red signal LED parts 14, preferably four red signal LED parts 14, are mounted around the white signal LED parts 15 at regular intervals. The white signal LED parts 15 and the red signal LED parts are operated when a signal is generated. As shown in the drawing, the length-adjustable flashing tube 20 is in the form of an antenna made by connecting a number of joints, and the diameter of each joint is gradually reduced when the joint becomes more distant from the grip part 10. The length-adjustable flashing tube is a tube made of light-transmittable material, and includes a holding jaw (not shown) formed on the rear end portion thereof for preventing a complete separation from the front end portion of the grip part 10 and a holding part (not shown) mounted on the front end portion of the grip part and corresponding to the holding jaw of the length-adjustable flashing tube.

For the flash light function, the length-adjustable flashing tube 20 is telescoped like the antenna to minimize the length of the length-adjustable flashing tube 20, so that the signal stick emits light generated from the white signal LED part 15 and the user carries it conveniently. The reflection plate 18 is inserted under the white signal LED part 15 to provide an effective flash light function due to reflection of light.

A rechargeable battery can be used inside the power supply part, and the grip part may have a charging part and a charging connector contained therein for electrically charging the charging part through the external power source such as a battery of a car.

Furthermore, the length-adjustable flashing tube can be stretched by pulling the upper end portion of the length-adjustable flashing tube with the user hand, and folded by elasticity of a spring in a case where the length-adjustable flashing tube is inserted into the grip part.

FIG. 2 is a sectional view showing the constitution of the traffic signal stick according to the preferred embodiment of the present invention. Referring to the drawing, the operation and effects of the present invention will be described as follows.

The traffic signal stick according to the present invention is operated by the switch part 11 located on the grip part 10. The switch part 11 is divided into a power off mode, a red LED mode and a white LED mode. The power source generated from the power supply part is not supplied to each part when the switch part 11 is located at the center for the power off mode. However, the power supply part supplies electric power to each part in the other modes, and so, actions corresponding to each mode are performed according to a control signal of a controlling part of the circuit board 13.

When the user presses the switch part 11 to the left to convert the power off mode into the red LED mode for operation control or traffic control, the controlling part of the circuit board generates the corresponding signal and operates red LEDs 22 as a signal so as to help the traffic control and safe work. When the switch part 11 is converted into the white LED mode, the controlling part of the circuit board operates the white signal LED part 15 so as to provide the flash light function.

FIG. 2 shows the length-adjustable flashing tube 20 which can be telescoped like the antenna, the white signal LEDs of the white signal LED parts 15 and the red LEDs 22 fixedly mounted on the grip part 10. A diffusion mirror mounted on the uppermost layer of the length-adjustable flashing tube 20 for diffusing light of the white signal LED part. The grip art 10 is coupled with the flashing tube 20 having the holding jaw via a coupling part (not shown) having the holding part connected with the grip part in a screw type. It would be appreciated that any one of the well-known means for preventing separation of the flashing tube from the grip part can be used.

FIG. 3 is a sectional view of a multi-functional traffic signal stick according to a modification of the present invention. The white signal LED part 15 is located on the front end portion of the flashing tube 20, and the diffusion mirror for diffusing the light of the white signal LED part is mounted on the uppermost layer of the flashing tube 20. Electricity is supplied to the white signal LED part 15 through a wire of a coil type or a straight type, and the red LEDs 22 are located on the coil type wire. The wire is flexible.

BRIEF DESCRIPTION OF THE DRAWINGS

FIG. 1 is a perspective view of the outward appearance of a multi-functional traffic signal stick according to the present invention, wherein FIG. 1(*a*) shows a state where a length-adjustable flashing tube is stretched, and FIG. 1(*b*) shows a state where the length-adjustable flashing tube is telescoped.

FIG. 2 is a sectional view of the multi-functional traffic signal stick having white and red signal LED parts mounted on the upper end portion of a grip part of the present invention.

FIG. 3 is a brief sectional view of another multi-functional traffic signal stick according to a modification of the present invention, wherein a white signal LED part is located on the front end portion of the length-adjustable flashing tube, electric power is supplied through a coil type wire, and red LEDs are located on the coil type wire.

EXPLANATION OF ESSENTIAL REFERENCE NUMERALS IN DRAWINGS

10: grip part 11: switch part
12: power supply part 13: circuit board 14: red signal LED part 15: white signal LED part
16: supporting rod 17: groove
18: reflection plate 20: length-adjustable flashing tube
22: red LED

INDUSTRIAL APPLICABILITY

As described above, the multi-functional traffic signal stick according to the present invention can allow a police officer to carry it for facilitating flow of cars or checking up the cars on the road. Furthermore, the present invention has a function of a signal stick and a function of a flash light. Moreover, the present invention can allow the user to carry it conveniently when it is used as a flash light by telescoping each joint of the length-adjustable flashing tube in the antenna type into a larger tube, and effectively emit very bright light by mounting the reflection plate 18 on the white signal LED part. In addition, the present invention can be mounted uprightly on the road or other proper place by a tripod having supporting rods mounted on the grip part 10, thereby preventing additional accidents by sending a signal to other people or cars when an accident occurs even though there is no worker.

The invention claimed is:

1. A multi-functional traffic signal stick comprising:
   a grip part (10) having a plurality of supporting rod grooves (17) formed on the outer circumferential surface thereof at regular intervals;
   a switch part (11) mounted on and electrically connected to the grip part (10) for allowing for selection of a signal generating function and a flash light function;
   a power supply part (12) disposed inside the grip part (10) and connected to the switch part, the power supply part containing a battery therein;
   a circuit board (13) installed at an upper portion of the inside of the grip part for controlling power-off and emission of a red signal LED part (14) and a white signal LED part (15) in response to a signal generated from the switch part (11);
   a length-adjustable flashing tube (20) connected to the grip part in such a manner as to be telescoped or stretched in an antenna type;
   a plurality of supporting rods (16) pivotally mounted at a lower end portion of the grip part so as to be fit into the supporting rod grooves (17) of the grip part (10) when being folded;
   a reflection plate (18) mounted at a lower portion of the white signal LED part (15);
   the white signal LED part (15) mounted at the central portion of the upper surface of the grip part, and the red signal LED part (14) mounted around the white signal LED part (15);
   the switch part (11) turning off the power supply part (12) when the switch part is maintained at its top surface horizontally, allowing the red signal LED part(14) to be operated to serve as a signal light when the switch part is pressed at its top surface to the left, and allowing the white signal LED(15) part to be operated to serve as a flash light when the switch part is pressed at its top surface to the right; and
   the supporting rods (16) inserted into the supporting rod grooves (17) formed on the grip part (10), and serving as a tripod when they are unfolded so as to support the multi-functional traffic signal stick.

2. A multi-functional traffic signal stick according to claim 1, wherein the grip part (10) includes a charging part and a charging connector contained therein instead of the power supply part (12) for electrically charging the charging part through a battery of a car or other external power source, and a diffusion mirror is mounted on the upper end portion of the length-adjustable flashing tube above the white signal LED part (15) for diffusing light.

3. A multi-functional traffic signal stick comprising:
   a grip part (10) having a plurality of supporting rod grooves (17) formed on the outer circumferential surface thereof at regular intervals;
   a switch part (11) mounted on and electrically connected to the grip part (10) for allowing for selection of a signal generating function and a flash light function;
   a power supply part (12) disposed inside the grip part (10) and connected to the switch part, the power supply part containing a battery therein;
   a circuit board (13) installed at an upper portion of the inside of the grip part for controlling power-off and emission of a red signal LED part (14) and a white signal LED part (15) in response to a signal generated from the switch part (11);
   a length-adjustable flashing tube (20) connected to the grip part in such a manner as to be telescoped or stretched in an antenna type;
   a plurality of supporting rods (16) pivotally mounted at a lower end portion of the grip part so as to be fit into the supporting rod grooves (17) of the grip part (10) when being folded;
   a white signal LED part (15) mounted at the center of the front end portion of the length-adjustable flashing tube (20);
   a flexible wire of a coil type or a straight type for connecting the white signal LED part to the power supply part (12); and
   a plurality of red LEDs (22) mounted on the flexible wire in such a manner as to spaced apart from one another at regular intervals; and
   a diffusion mirror mounted on the upper end portion of the length-adjustable flashing tube above the white signal LED part (15) for diffusing light.

* * * * *